(12) United States Patent
Kiriyama et al.

(10) Patent No.: US 10,747,893 B2
(45) Date of Patent: Aug. 18, 2020

(54) DEVICE AND METHOD FOR DETERMINING CONTENT OF ACCESS CONTROL OF DATA

(71) Applicant: International Business Machines Corporation, Armonk, NY (US)

(72) Inventors: Hayato Kiriyama, Kawasaki (JP); Tomohiro Shioya, Tokyo (JP); Tadashi Tsumura, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 704 days.

(21) Appl. No.: 13/961,222

(22) Filed: Aug. 7, 2013

(65) Prior Publication Data

US 2014/0059700 A1    Feb. 27, 2014

(30) Foreign Application Priority Data

Aug. 22, 2012 (JP) .................................. 2012-183150

(51) Int. Cl.
G06F 21/62 (2013.01)
G06F 21/60 (2013.01)

(52) U.S. Cl.
CPC ............ *G06F 21/62* (2013.01); *G06F 21/606* (2013.01)

(58) Field of Classification Search
CPC ... H04L 9/32–3297; H04L 63/04–0492; H04L 63/08–0892; G06F 21/30–46;
(Continued)

(56) References Cited

U.S. PATENT DOCUMENTS 6,304,906 B1 * 10/2001 Bhatti et al. .................. 709/227
2005/0131990 A1 * 6/2005 Jewell ................. G06F 11/1464
709/201
(Continued)

FOREIGN PATENT DOCUMENTS

JP    2003141129 A    5/2003
JP    2007534251 A    11/2007
(Continued)

*Primary Examiner* — Ashokkumar B Patel
*Assistant Examiner* — Quazi Farooqui
(74) *Attorney, Agent, or Firm* — Cuenot, Forsythe & Kim, LLC

(57) ABSTRACT

Determining the content of access control to data based on classification results obtained by classifying data includes recording setting information that sets a plurality of classification engines for predetermined conditions related to either data or to the access to the data and acquiring data subject to access when access to the data subject to access is requested. Responsive to satisfaction of predetermined conditions related to either the data subject to the access or access to the data subject to access, classification of data subject to access by the plurality of classification engines set for predetermined conditions in the setting information is indicated using a processor. Further, using the processor, the content of access control to the data subject to access based on classification results obtained by the plurality of classification engines classifying data subject to access is determined based on the indicating classification of data.

20 Claims, 10 Drawing Sheets

(58) Field of Classification Search
CPC ............. G06F 21/60–645; G06F 21/62; G06F 21/606; G06F 21/00
USPC .......... 726/2–6, 11, 14, 17, 27–30, 1; 713/1, 713/100, 161; 707/602, 607, 687–704
See application file for complete search history.

(56) References Cited

U.S. PATENT DOCUMENTS

| | | | |
|---|---|---|---|
| 2007/0143851 A1* | 6/2007 | Nicodemus | H04L 63/1433 726/25 |
| 2008/0005248 A1* | 1/2008 | Fink | G06Q 10/107 709/206 |
| 2009/0198697 A1* | 8/2009 | Bilger | G06F 21/6218 |
| 2011/0066606 A1* | 3/2011 | Fox et al. | 707/706 |
| 2012/0166442 A1 | 6/2012 | Furuichi et al. | |
| 2012/0197681 A1* | 8/2012 | Marrelli et al. | 705/7.27 |
| 2012/0215780 A1* | 8/2012 | Faitelson et al. | 707/737 |
| 2013/0047260 A1* | 2/2013 | Hoefel et al. | 726/27 |

FOREIGN PATENT DOCUMENTS

| | | |
|---|---|---|
| JP | 2012137973 A | 7/2012 |
| WO | 2005104480 A2 | 11/2005 |

\* cited by examiner

Classification Engine Reference Setting File

If any files in local drive
Then
refer to company classifier (default)
refer to my classifier (added)

Fig. 2

Access Control Policy File

If classification results
include "Project A"
Then deny sending mail
except customer A

Fig. 3

Classification Engine Reference Setting File

If files originated by dev. team
Then
refer to company classifier (default)
refer to sales classifier (added)
refer to dev classifier (added)

Fig. 5

Access Control Policy File

If classification results
include "Confidential"
Then deny sending mail to
any customers

Fig. 6

DEVICE AND METHOD FOR DETERMINING CONTENT OF ACCESS CONTROL OF DATA

CROSS-REFERENCE TO RELATED APPLICATIONS

This application claims the benefit of Japan Application Number 2012-183150 filed on Aug. 22, 2012, which is fully incorporated herein by reference.

BACKGROUND

Companies and the like possess a large amount of sensitive data that should not be leaked to the outside. For DLP (Data Leak Prevention), the sensitive data is classified based on policy, and access control is performed in compliance with the classification results.

Technology for data classification and access control exists in a variety of forms. One approach is to perform document classification in a plurality of stages by first classifying a group of documents in categories in a first stage, then further classifying into another plurality of categories, by recursively calling a document classifying engine such as "CB Classifier" that classifies a plurality of provided documents into a plurality of categories based on a vector space method, and displaying on a screen the vertical relationship of the categories that are used in each stage in the form of a tree, designating the categories at the ends of the tree, and displaying on a screen a list of the documents that were classified into that category.

Another approach uses an electronic communication system having a user device containing a first Internet protocol stack that operates based on a first Internet protocol (IPv6) and a second Internet protocol stack that operates based on a second Internet protocol (IPv4), a packet wireless system (GPRS) network that transfers Internet packet data based on the second Internet protocol (IPv4), and an interaction unit. The electronic communication system provides a policy control function (PCF) that provides first authorizing information that designates conditions for permitting transfer of Internet packet data between the user device and a communicating partner node based on the first Internet protocol (IPv6), and a service-based policy converter (SBLP-T) that generates second authorizing information from the first authorizing information from the policy control function (PCF) based on the second Internet protocol (IPv4), and allows transfer of Internet packet data through the packet wireless system (GPRS) network based on the second Internet protocol (IPv4); wherein the packet wireless system (GPRS) network receives the second authorizing information based on the second Internet protocol (IPv4), and provides a service base local policy (SBLP) enforcer that receives or transmits Internet packet data to or from the packet wireless system (GPRS) network based on the second Internet protocol (IPv4).

Still another approach extracts and analyzes first data that is a classification standard from data subject to classification and attributes thereof, determines whether the data subject to classification or a predetermined first part that includes the first data belongs to the first classification category, and if the data belongs to the category, applies first access control settings for an action to the data subject to classification or the predetermined first part, and if access control for the action on the data subject to classification or the predetermined first part is on hold, second data that becomes the standard for classification is extracted and analyzed from the data subject to classification or attributes thereof, the second data is determined to belong to the second classification category, and if the data belongs to the second classification category, the second access control set is applied to the first action that is on hold.

BRIEF SUMMARY

A system that determines the content of access control to data based on the classification results obtained by classifying data includes a processor programmed to initiate executable operations. The executable operations include recording setting information that sets a plurality of classification engines for predetermined conditions related to either data or access to data, and acquiring data subject to the access when access to the data subject to access is requested. The executable operations also include indicating classification of data subject to access by the plurality of classification engines set for the predetermined conditions in the recorded setting information responsive to satisfaction of the predetermined conditions for either the data subject to access or access to the data subject to the access. The executable operations further include determining the content of access control to the data subject to the access based on classification results obtained by the plurality of classification engines classifying data subject to access based on the indicating of classification data.

A method of determining the content of access control to data based on classification results obtained by classifying data includes recording setting information that sets a plurality of classification engines for predetermined conditions related to either data or access to the data, acquiring data subject to access when access to the data subject to access is requested, and indicating, using a processor, classification of data subject to access by the plurality of classification engines set for predetermined conditions in the setting information responsive to satisfaction of predetermined conditions related to either the data subject to the access or access to the data subject to the access. The method also includes determining, using the processor, the content of access control to the data subject to access based on classification results obtained by the plurality of classification engines classifying data subject to access based on the indicating of classification data.

A computer program product for determining the content of access control to data based on the classification results obtained by classifying data includes a computer readable memory having program code stored thereon. The program code is executable by a processor to perform a method. The method includes recording, using the processor, setting information that sets a plurality of classification engines for predetermined conditions related to either data or to the access to the data and acquiring, using the processor, data subject to access when access to the data subject to access is requested. The method further includes indicating, using the processor, classification of data subject to access by the plurality of classification engines set for predetermined conditions in the setting information responsive to satisfaction of predetermined conditions related to either the data subject to the access or access to the data subject to the access. The method also includes determining, using the processor, the content of access control to the data subject to access based on classification results obtained by the plurality of classification engines classifying data subject to access based on the indicating of classification data.

BRIEF DESCRIPTION OF THE SEVERAL VIEWS OF THE DRAWINGS

FIG. 2 is a diagram illustrating an example of a classification engine reference setting file of the first embodiment.

FIG. 3 is a diagram illustrating an example of an access control policy file of the first embodiment.

FIG. 5 is a diagram illustrating an example of a classification engine reference setting file of the second embodiment.

FIG. 6 is a diagram illustrating an example of an access control policy file of the second embodiment.

DETAILED DESCRIPTION

Figure 1:
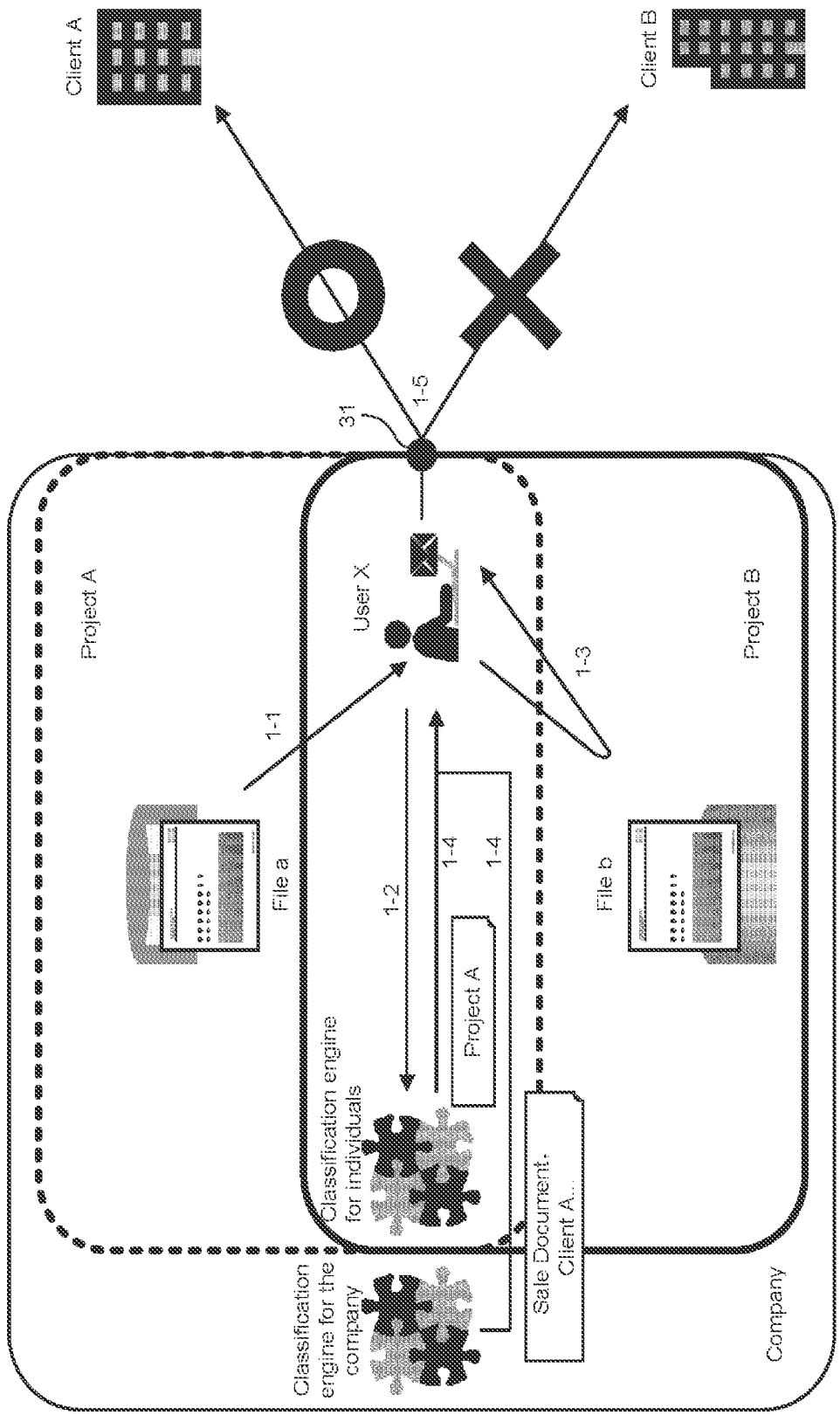
FIG. 1 is a diagram schematically illustrating a first embodiment.

The present invention relates to a device and method for determining content of access control of data. The present invention more particularly relates to a device and method for determining content of access control of data based on classification results attained by classifying the data.

As described above, for DLP, data is classified, and access control is performed based on classification results, but classifying data and performing access control by one classification engine is popular, and normally, data is not classified and access control is not performed by a plurality of classification engines. Nevertheless, classifying data and performing access control by a plurality of classification engines is useful in terms of access control from various perspectives being possible.

For example, if one classification engine (including knowledge base, classification rules, and the like) is managed in a company or the like, the classification engine tends to be for general use, and is not frequently renewed. Therefore, classification preferred by the user cannot always be performed using the classification engine. Specifically, the conventional classification engine cannot cover terminology and the like for new terms and user classification. Therefore, in addition to the conventional classification engine, performing classification by using a classification engine for a specific application specialized in team, individuals, and the like is useful.

Some conventional techniques classify a plurality of documents in a plurality of categories, but access control is not performed based on classification results.

In other conventional techniques, if an IP packet is detected to match in classification, and a resource is used within the acknowledged limits, a gate is enabled, the IP packet is sent to a UMTS network or external packet network through a GGSN. Nevertheless, the IP packet is not classified by using a plurality of classification engines.

In still other conventional techniques, a plurality of classification engines are provided, but when a user performs a predetermined operation towards a document file, the document file is classified using the first classification engine, the first access control set is applied against the operation towards the document file, and if the application result is "reserved," the document file is classified using the second classification engine; and when a user performs a predetermined operation towards a document, the document file is classified using a plurality of classification engines, and an access control set is applied against the operation towards the document file.

An object of the embodiments of the present invention is to determine access contents of data of an access target from various perspectives.

Based on the forgoing objects, embodiments of the present invention provide a device that determines the content of access control to data based on the classification results obtained by classifying data, including: a setting information recording part that records setting information that sets a plurality of classification engines for predetermined conditions related to either data or access to data; an acquiring part that acquires data subject to the access when access to the data subject to access is requested; an indicating part that indicates classification of data subject to access by the plurality of classification engines set for the predetermined conditions in the setting information recorded in the setting information recording part when the predetermined conditions are satisfied for either the data subject to access or access to the data subject to the access; and a determining part that determines the content of access control to the data subject to the access based on classification results obtained by the plurality of classification engines classifying data subject to access based on an indication by the indicating part.

Herein the device can also include a definition information recording part that records definition information that defines the content of access to data for the classification results obtained by classifying the data, wherein the determining part determines the content of the access control defined for the classifications results obtained by the plurality of classification engines classifying the data subject to the access in the content of the access control to the data subject to the access for the defined information recorded in the defined information recording part.

Furthermore, the device can further include a generating part that generates one classification results from the plurality of classification results obtained by classification of the data subject to access, by the plurality of classification engines, wherein the determining part determines the content of the access control to the data subject to access, based on one classification result generated by the generating part.

Furthermore, the device can further include: a receiving part that receives classification information that indicates the classification of the data input by a user managing the data, and a registering part that registers the classification information received by the receiving part as information used when at least one of the classification engines classifies data in at least one of the classifications from the plurality of classification engines.

Furthermore, with this device, the plurality of classification engines further includes a general use classification engine and a specific application classification engine.

Furthermore, embodiments of the present invention provide a system, including: a plurality of classification devices that classify data; and an access control device that controls access to the data based on classification results obtained by the plurality of classification engines classifying the data, wherein the access control device includes: a setting information recording part that records the setting information that sets at least two classification devices from the plurality of classification devices for the predetermined conditions related to either the data or the access to the data; a definition information recording part that records the definition information that defines the content of access control to the data for the classification results obtained by classifying the data; an acquiring part that acquires the data subject to access when access to the data subject to access is requested; an indicating part that indicates the classification of data subject to access in at least the two classification devices set for the predetermined conditions for the setting information recorded in the setting information recording part when the predetermined conditions related to either the data subject to access or access to the data subject to access are satisfied; a determining part that determines the content of the access control defined for the classification results obtained by at least the two classification devices classifying the data subject to access based on an indication by the indicating part for the content of the access control to the data subject to access for the defined information recorded in the setting information recording part; and a control part that controls access to the data subject to the access based on the content of the access control determined by the determining part.

Furthermore, embodiments of the present invention provide a method for determining the content of access control to data based on classification results obtained by classifying data, including: recording setting information that sets a plurality of classification engines for predetermined conditions related to either data or to the access to the data, to the setting information recording part; acquiring data subject to access when access to the data subject to access is requested; indicating classification of data subject to access by the plurality of classification engines set for predetermined conditions in the setting information recorded by the setting information recording part, when predetermined conditions related to either the data subject to the access and access to the data subject to access are satisfied; and determining the content of access control to the data subject to access based on classification results obtained by the plurality of classification engines classifying data subject to access based on an indication by the indicating part.

Furthermore embodiments of the present invention also provide a program that causes a computer to function as a device that determines the content of access control to the data based on the classification results obtained by classifying the data, whereby the computer is made to function as: a setting information recording part that records setting information that sets a plurality of classification engines for predetermined conditions related to either data or access to data; an acquiring part that acquires data subject to the access when access to the data subject to access is requested; an indicating part that indicates classification of data subject to the access in the plurality of classification engines set for predetermined conditions in the setting information recorded by the setting information recording part when the predetermined conditions related to either the data subject to access or access to the data subject to access are satisfied; and a determining part that determines the content of access control to the data subject to access based on classification results obtained by the plurality of classification engines classifying data subject to the access based on an indication by the indicating part.

According to one or more embodiments of the present invention, access control content of data of subject to access can be determined from various perspectives.

An embodiment of the present invention is described below while referring to the attached drawings.

First, with the present embodiment, a classification engine for a specific application is introduced in addition to the general use classification engine. Herein, the general use classification engine is a classification engine managed by a company for example. Classification labels defined by the company such as "Company Confidential," "PH," and the like can be attained as a classification result from the classification engine managed by a company. Furthermore, the specific application classification engine is a classification engine for teams, for individuals, and the like, but initially can also be prepared by copying information from the general use classification engine (for example, a classification engine managed by the company).

With the present embodiment, the specific application classification engine has the following characteristics.

The first characteristic includes the ability to be referenced based on specific conditions when accessing data of an arbitrary user.

The second characteristic includes the ability to return classification results of the provided data as a list of classification labels presenting the classifications of the data (referred to as "classification label list" below), or as an index presenting the degree of relevance between the data and the classification labels (simply referred to as "relevance" below). Herein, the classification label list is a list that arranges multiple classification labels such as "Sales Documents," "Client A," and the like for example. Furthermore, the relevance indicates the degree of relation of the classification label to the data such as "Confidential 90%" and the like for example. Note that the relevance can also indicate the degree of relation of the classification label to the data for each classification label in the classification label list.

The third characteristic includes the ability to learn based on classification labels input by an arbitrary user. Herein, the input classification label can be a label newly prepared by a user or a label that has already been prepared by the classification engine.

Furthermore, with the present embodiment, when a user performs an action to access the data, a plurality of referenced classification engines can be selected based on the status of the data or action. The plurality of referenced classification engines are described below as previously defined, but can also be determined dynamically.

Furthermore, with the present embodiment, access control content is determined based on a plurality of classification results respectively attained from the plurality of classification engines. At this time, if the classification results differ based on the classification engines, the access control content can be determined in accordance with the user settings. Furthermore, access control content can be determined not only by the classification results, but also by the fact that classification was performed by a specific classification engine, or by the classification time, and the like.

Furthermore, with the present embodiment, the classification labels can be edited when the user completes a data browsing action. Thereby, the classification engine learns the edited classification labels as input based on the application.

Next, a summary operation of the present embodiment is described by an embodiment assuming a specific scenario.

First Embodiment

The first embodiment is an example that prevents leaking by an inadvertent operation of information that one possesses and needs to protect.

FIG. 1 is a diagram schematically illustrating the first embodiment. As illustrated in the diagram, for the first embodiment, user X is affiliated with both project A with client A as a target, and project B with client B as a target in a certain company. In this situation, user X downloads file a of project A to their own PC (Personal Computer) (1-1). Furthermore, user X inputs the correspondence between file a and classification label "Project A" into the classification engine for individuals, and thus trains the engine (1-2). Afterwards, at arbitrary timing, user X reuses file a and creates file b of Project B, and attempts to send the file outside the company through electronic mail (1-3). Nevertheless, in this case, because there is a chance of confidential information relating to project A remaining in file b that was created by using file a, transmission of file b to clients other than client A (for example, client B) should be prevented. Furthermore, reference to the classification engine that is within the boundary line is performed at point 31 that straddles the boundary line of the diagram.

In the first embodiment, a classification engine for companies and a classification engine for individuals are referenced, and classification results are returned from each classification engine (1-4). Specifically, "Sales Documents," "Client A," and the like are returned as classification results from the classification engine for companies, and "Project A" is returned as a classification result from the classification engine for individuals. Note that the classification engine to be referenced at this time are determined based on a classification engine reference setting file, but the classification engine reference setting file is described later.

When the classification results are returned from each classification engine as described above, access control content is determined based on the classification results (1-5). Note that access control content is determined based on an access control policy file, but the access control policy file is described later.

FIG. 2 is a diagram illustrating an example of a classification engine reference setting file of the first embodiment. As illustrated in the diagram, in an example of the classification engine reference setting file, the classification engine for individuals (denoted as "my classifier") to be referenced as well as the classification engine for companies (denoted as "company classifier") is defined for any file that exists in the local drive of the PC. Note that the type and number of the referenced classification engines can be changed depending on the destination of the electronic mail. Furthermore, a plurality of classification engine reference setting files are prepared, and the referenced classification engine reference setting file can be switched depending on the destination of the electronic mail.

FIG. 3 is a diagram illustrating an example of an access control policy file of the first embodiment. As illustrated in the diagram, the example of the access control policy file defines that if the classification results contain "Project A," then transmission of an electronic mail to clients other than client A should be denied.

Second Embodiment

The second embodiment is an example that prevents leaking to the public of information that is permitted to be disclosed to a restricted scope.

Figure 4:
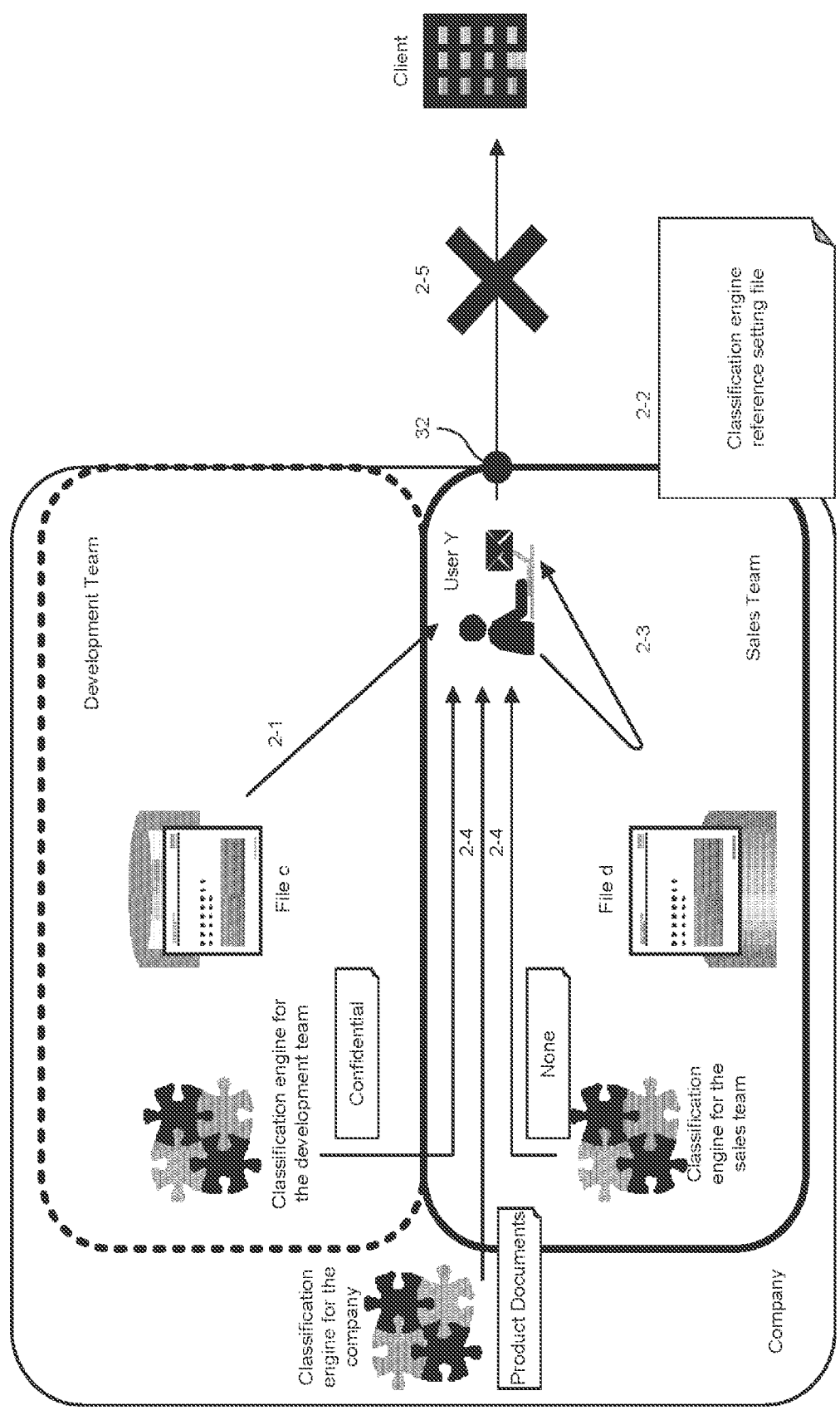
FIG. 4 is a diagram schematically illustrating a second embodiment.

FIG. 4 is a diagram schematically illustrating the second embodiment. As illustrated in the diagram for the second embodiment, user Y belongs to a sales team that coordinates and conducts business with a development team. In this situation, user Y downloads file c of the development team to their own PC (2-1). Furthermore, user Y updates the classification engine reference setting file (2-2). Specifically, an indication is added to the classification engine reference setting file to reference the classification engine for the development team so that information relating to products under development by the development team is not leaked. Note that the classification engine reference setting file is described later. Afterwards, at an arbitrary time, user Y reuses file c and creates file d for sales team, and attempts to send the file outside the company through electronic mail (2-3). Nevertheless, in this case, because there is a chance of confidential information related to the products under development to be remaining in file d that was created by using file c, transmission to clients of file d should be prevented.

Furthermore, reference to the classification engine that is within the boundary line is performed at point 32 that straddles the boundary line of the diagram. In the second embodiment, in addition to the classification engine for the company and the classification engine for the sales team, a classification engine for the development team is also referenced, and classification results from each classification engine are returned (2-4). Specifically, "Product documents" and the like are returned as classification results from the classification engine for the company, and "Confidential" is returned as a classification result from the classification engine for the development team. When the classification results are returned from each classification engine as described above, access control content is determined based on the classification results (2-5). Note that access control content is determined based on an access control policy file, but the access control policy file is described later.

FIG. 5 is a diagram illustrating an example of a classification engine reference setting file of the second embodiment. As illustrated in the diagram, this example of the classification engine reference setting file defines that a development team classification engine (denoted as "dev classifier") should be referenced in addition to the classification engine for the company (denoted as "company classifier") and the classification engine for the sales team (denoted as "sales classifier"), for files derived from the development team. Note that the type and number of the referenced classification engines can be changed depending on the destination of the electronic mail. Furthermore, a plurality of classification engine reference setting files are prepared, and the referenced classification engine reference setting file can be switched depending on the destination of the electronic mail.

FIG. 6 is a diagram illustrating an example of an access control policy file of the second embodiment. As illustrated in the diagram, this example of the access control policy file defines that if the classification results contain "Confidential," then transmission of an electronic mail to any clients should be denied.

Note that, in the second embodiment, if "Confidential" is no longer applicable after a product press release, the development team updates the classification engine for the development team. Specifically, the correspondence between a file related to products that have had a press release, and the classification label "Confidential" is cancelled. Thereby, the sales supervisor can send an electronic mail to the client even for a file that reuses a file related to the product. In other words, access control content is transparently changed for the sales supervisor.

An access control system that implements the above summary operation is described below in detail. First, a hardware configuration of the access control system is described. Note that as described above, the access control system is configured from an access control device and a classification device, but since these devices have a similar hardware configuration, the access control system is described as a hardware configuration or a computer 90.

Figure 7:
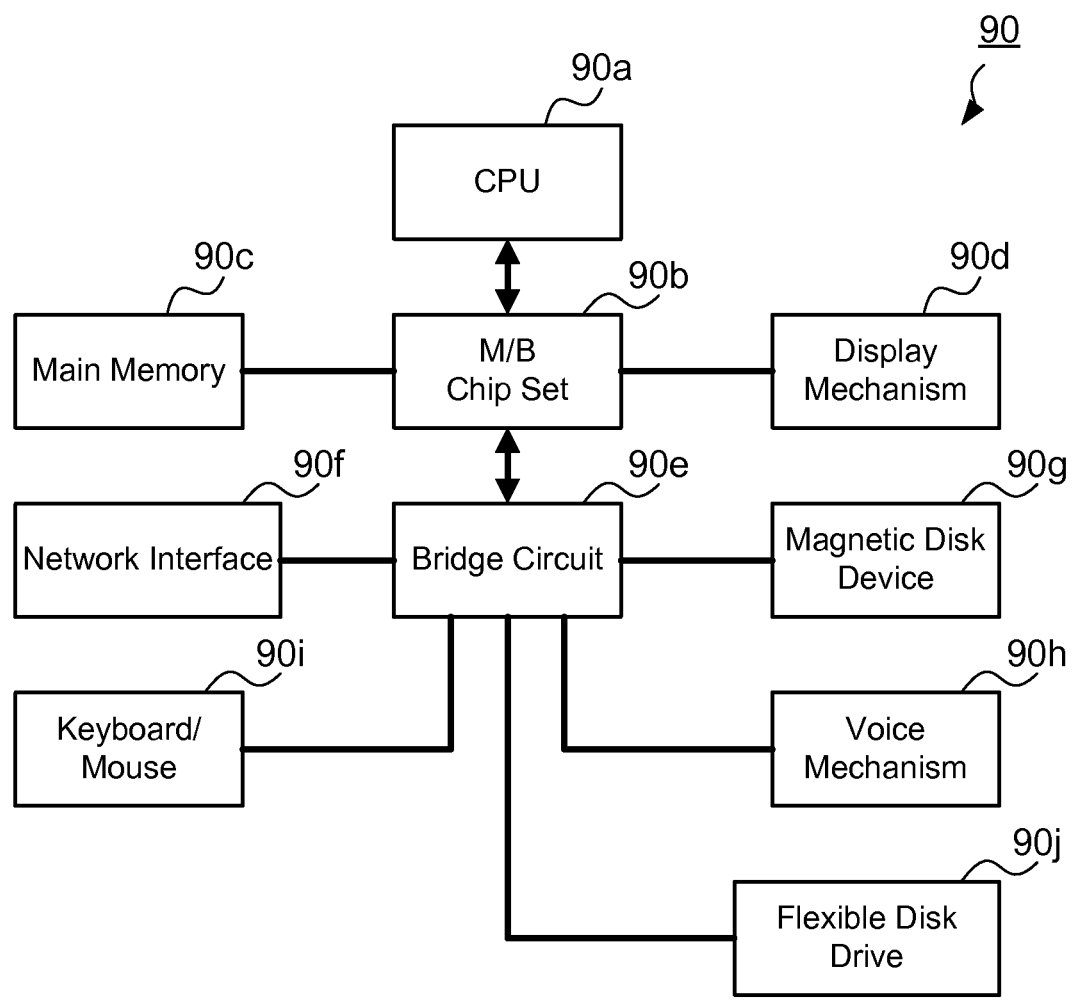
FIG. 7 is a diagram illustrating an example of a computer hardware configuration applicable to an embodiment of the present invention.

FIG. 7 is a diagram illustrating an example of the computer 90 hardware configuration. As illustrated in the diagram, the computer 90 provides a CPU (Central Processing Unit) 90a, which is computing means, a main memory 90c that is connected to the CPU 90a through an M/B (Motherboard) chip set 90b, and a display mechanism 90d that is also connected to the CPU 90a through the M/B chip set 90b. Furthermore, in the M/B chip set 90b, a network interface 90f, a magnetic disk device (HDD) 90e, a voice mechanism 90h, a keyboard/mouse 90i, and a flexible disk drive 90j are connected through a bridge circuit 90e.

Note that in FIG. 7, each of the component elements are connected through a bus. For example, the CPU 90a and the M/B chipset 90b, or the M/B chipset 90b and the main memory 90c are connected together through a CPU bus. Furthermore, it is also possible for the M/B chip set 90b and the display mechanism 90d to be connected through an AGP (Accelerated Graphics Port), but if the display mechanism 90d contains a PCI Express compatible video card, the M/B chip set 90b and the video card are connected through a PCI Express (PCIe) bus. Furthermore, if connected to the bridge circuit 90e, the network interface 90f can use PCI Express for example. Furthermore, the magnetic disk device 90g can use a serial ATA (AT Attachment), a parallel transfer ATA, or a PCI (Peripheral Components Interconnect). Furthermore, the keyboard/mouse 90i and flexible disk drive 90j can use a USB (Universal Serial Bus).

Next, the function and operation of the access control system are described.

Figure 8:
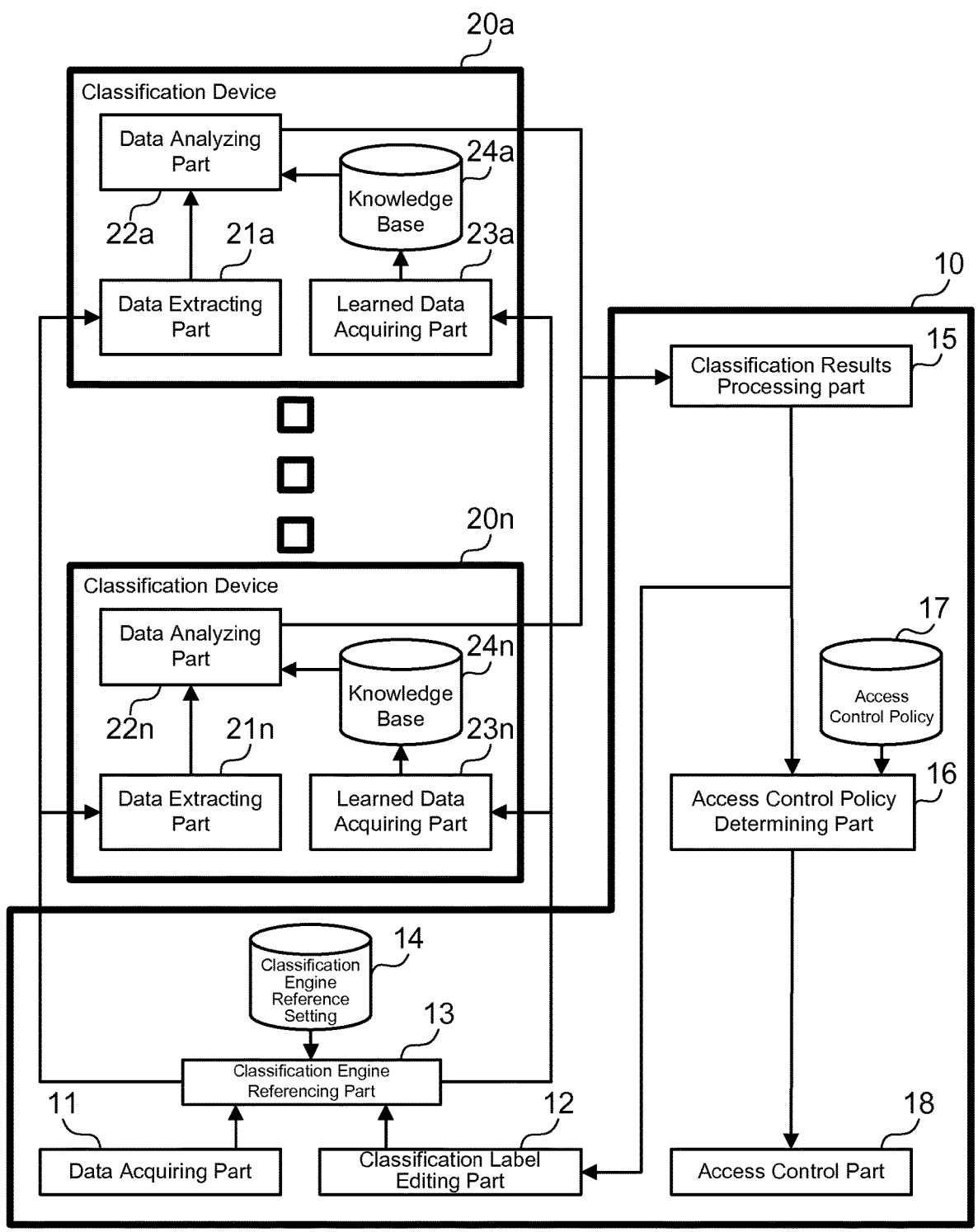
FIG. 8 is a diagram illustrating an example of a functional configuration of an access control system for an embodiment of the present invention.

FIG. 8 is a diagram illustrating an example of a functional configuration of an access control system. As illustrated in the diagram, the access control system contains an access control device 10 and classification devices 20a through 20n. The access control device 10 is a device that requests classification of data to any classification device 20a through 20n when a user requests access to the data, and performs access control of the data based on the classification results.

Classification devices 20a through 20n are devices that contain a classification engine, and classify data by operation of the classification engines. Note that in the drawings, the classification devices are indicated as 20a through 20n, but when differentiation between these devices is not necessary, the devices are designated as classification device 20. Similarly, with data extraction parts 21a through 21n, which are components of the classification devices 20a through 20n, data analysis parts 22a through 22n, training data acquiring parts 23a through 23n, and knowledge bases 24a through 24n, when differentiation between these component elements is not necessary, these component elements are designated as data extraction part 21, data analysis part 22, training data acquiring part 23, and knowledge base 24 respectively. Furthermore, in the drawings, the number of classification devices 20 are not restricted, but if there are a plurality of classification devices 20, then multiple classification devices can be provided. Furthermore, the classification device 20 and the classification engine correspond 1-to-1, so the function that classifies the data is designated below as "classification device" if depicted from the hardware perspective, or designated as "classification engine" if depicted from the software perspective.

First, the access control device 10 is described. The access control device 10 provides a data acquiring part 11, a classification label editing part 12, a classification engine referencing part 13, a classification engine reference setting recording part 14, a classification results processing part 15, an access control policy determining part 16, an access control policy recording part 17, and an access controlling part 18.

The data acquiring part 11 acquires information relating to the data and access when the user requests access to the data. Herein, access to the data refers to access that leads to leaking of information; and examples include access for sending by email, copying to an external recording medium, uploading to a network, and printing. With the present embodiment, the data acquiring part 11 is provided as an example of an acquiring part that acquires the data subject to access.

The classification label editing part 12 receives the classification label list associated with the data at that time from the classification results processing part 15 and then displays the classification label list. Furthermore, the data and classification label pair is generated based on the user operation that edits the classification label list. Specifically, at the time when a data browsing action is completed, the user is required to input feedback (edited information of the classification label of the classification results) regarding the classification results. For example, the classification label input dialog is displayed when the file is closed using an application plugin. With the present embodiment, a classification label is used as an example of classification information displaying the classification of the data, and a classification label editing part 12 is provided as an example of a receiving part that receives the classification information.

Note that in order to also achieve convenience for the user, it is possible to flexibly set the conditions for editing the classification labels. For example, if a file during access satisfies a condition as an encrypted file, a condition as a compressed file, a condition of being located in a specific folder (temporary folder and the like), or a combination of these conditions, then the file can be considered a subject of compulsory feedback.

The classification engine referencing part 13 references a plurality of classification devices that classify the data acquired by the data acquiring part 11 from the classification devices 20a through 20n. Note that the classification device that classifies the data is determined based on the information relating to the data and the access acquired by the data acquiring part 11, as well as the classification engine reference setting file. With the present embodiment, the classification referencing part 13 is provided as an example of an indicating part that indicates the classification of data subject to access by the classification engine or the classification device.

Furthermore, the classification engine referencing part 13 references at least one classification device of the classification devices 20a through 20n that is trained by the pair of the data generated by the classification label editing part 12 and the classification label. Note that the trained classification device is determined depending on the conditions during classification label editing such as the user, data source, and the like. With the present embodiment, the classification engine referencing part 13 is provided also as an example of a registering part that registers the classification information to the classification engine.

The classification engine reference setting recording part 14 records the classification engine reference setting file that defines the classification engine that is referenced based on the conditions during a data access request. Herein, the conditions during a data access request include the user, process, time, location, access target, and the like for example. With the present embodiment, the condition during a data access request is used as an example of a predetermined condition relating to either data or access to data, and the classification reference setting file is used as an example of setting information that sets the classification engine or the classification device in the predetermined condition. Furthermore, a classification engine reference setting recording file 14 is provided as an example of a setting information recording part that records the setting information.

The classification results processing part 15 collects the classification results obtained from the classification device that is referenced as a classification device that classifies the data from among the classification devices 20a through 20n, and delivers the aggregate results to the access control policy determining part 16. With the present embodiment, the classification results processing part 15 is provided as an example of a generating part that generates one classification result from a plurality of classification results.

Note that the classification results processing part 15 can obtain different classification results from the plurality of classification devices 20. Herein, "obtain different classification results" refers to a case where classification label list is different when the plurality of classification devices 20 return the classification label list, but if the plurality of classification devices 20 return the relevance of the classification labels, then the difference between the maximum value and minimum value of the relevance value is equal or greater than the threshold. In this case, the following methods can be selected by the settings as a method of integrating the classification results.

The first method is a method that preliminarily determines the priority of the classification devices 20, and directly integrates the classification results obtained from the classification device 20 with the highest priority.

The second method is a method that dynamically determines the priority of the classification devices 20, and directly integrates the classification results obtained from the classification device 20 with the highest priority. Herein, the method that dynamically determines the priority can be considered a method where if for example, "Company Confidential" is included in all the classification label lists obtained from the plurality of classification devices 20, then the priority of the classification device for the company is set to maximum, and if "Personal" is included on all the classification label lists obtained from the plurality of classification devices 20, then the priority of the classification device for individuals is set to maximum.

The third method is a method used when the relevance of the classification label is returned from the plurality of classification devices 20, and is a method that prioritizes the highest relevance. In other words, the third method is a method that is on the safe side from the perspective of security. This method is described later in more detail.

The fourth method is a method used when classification label lists are returned from the plurality of classification devices 20, and is a method for determining by majority. For example, if there are more classification devices 20 that return a certain classification label than classification devices 20 that do not return the label, then the classification label is included in the aggregate results.

Note that in the description above, the classification label lists are returned from a part of the plurality of classification devices 20, and the relevance of the classification labels are returned from the remaining plurality of classification devices 20.

Furthermore, the classification results processing part 15 acquires information that identifies the classification device that returns the classification label included in the aggregate results, and information that presents the data and time when classification was performed by the classification device, and the like, and also delivers the information to the access control policy determining part 16.

The access control policy determining part 16 determines the content of the access control based on the aggregate results of the classification results received from the processing part 15. With the present embodiment, the access control policy determining part 16 is provided as an example of a determining part that determines the content of the access control of the data subject to access.

Furthermore, the access control policy determining part 16 can reference the information identifying the classification device 20 that returned the classification label included in the aggregate results received from the classification results processing part 15, and when access to specific data is requested, whether or not classification has been performed by the specific classification device 20 can be a condition for allowing access. For example, it is conceivable that a request for writing data to a server outside the department will require classification by the department classification device 20, and the like.

The access control policy recording part 17 records an access control policy file that defines the correspondence of the aggregate results of the classification results received from the classification results processing part 15 and the content of the access control to be performed when the aggregate results are received. With the present embodiment, the access control policy file is used as an example of defined information that defines the content of the access control for data of the classification results, and the access control policy recording part 17 is provided as an example of a defined information recording part that records the defined information.

The access control part 18 controls the access to the data based on the determination results by the access control policy determining part 16. With the present embodiment, the access control part 18 is provided as an example of a control part that controls access to the data subject to access.

Note that these functional parts are implemented by cooperation between the software and the hardware. Specifically, in the access control device 10, the following functional parts are achieved by the CPU 90a reading and executing a program from the magnetic disk device 90g to the main memory 90c for example, where the program provides the data acquiring part 11, the classification label editing part 12, the classification engine referencing part 13, the classification results processing part 15, the access control policy determining part 16, and the access control part 18. Furthermore, the classification engine reference setting recording part 14 and the access control policy recording part 17 are achieved by the magnetic disk device 90g for example.

Next, the classification device 20 is described. The classification device 20 provides a data extracting part 21, a data analyzing part 22, a learned data acquiring part 23, and a knowledge base 24. The data extracting part 21 extracts content and the like included in the data transferred from the classification engine referencing part 13 as structured data. The data analyzing part 22 analyzes the structured data that was extracted by the data extracting part 21 based on the knowledge base 24 and the like, and returns the relevance of the classification label list and the classification label. The learned data acquiring part 23 acquires a pair of specific data and the corresponding classification label from the classification engine referencing part 13, and registers to the knowledge base 24. The knowledge base 24 is a database that accumulates knowledge learned from a corpus in a format reusable by a computer. Alternatively, a simple classification rule file can be included that regulates whether to perform any classification if any keyword appears in the data.

Note that the functional parts are achieved by cooperation between the software and the hardware. Specifically, in the classification device 20, the following functional parts are achieved by the CPU 90a reading and executing a program from the magnetic disk device 90g to the main memory 90c for example, where the program provides the data extracting part 21, the data analyzing part 22, and the learned data acquiring part 23. Furthermore, the knowledge base 24 is achieved by the magnetic disk device 90g for example.

Next, the operation of the access control device 10 illustrated in FIG. 8 is described. In the access control device 10, when the data acquiring part 11 detects an access request for the data, the data acquiring part communicates the data classification request that includes information related to the access and the data to the classification engine referencing part 13. Furthermore, based on a user operation that edits the classification labels associated with the data, the classification label editing part 12 communicates the classification label request including the data and the edited classification labels to the classification engine referencing part 13.

Figure 9:
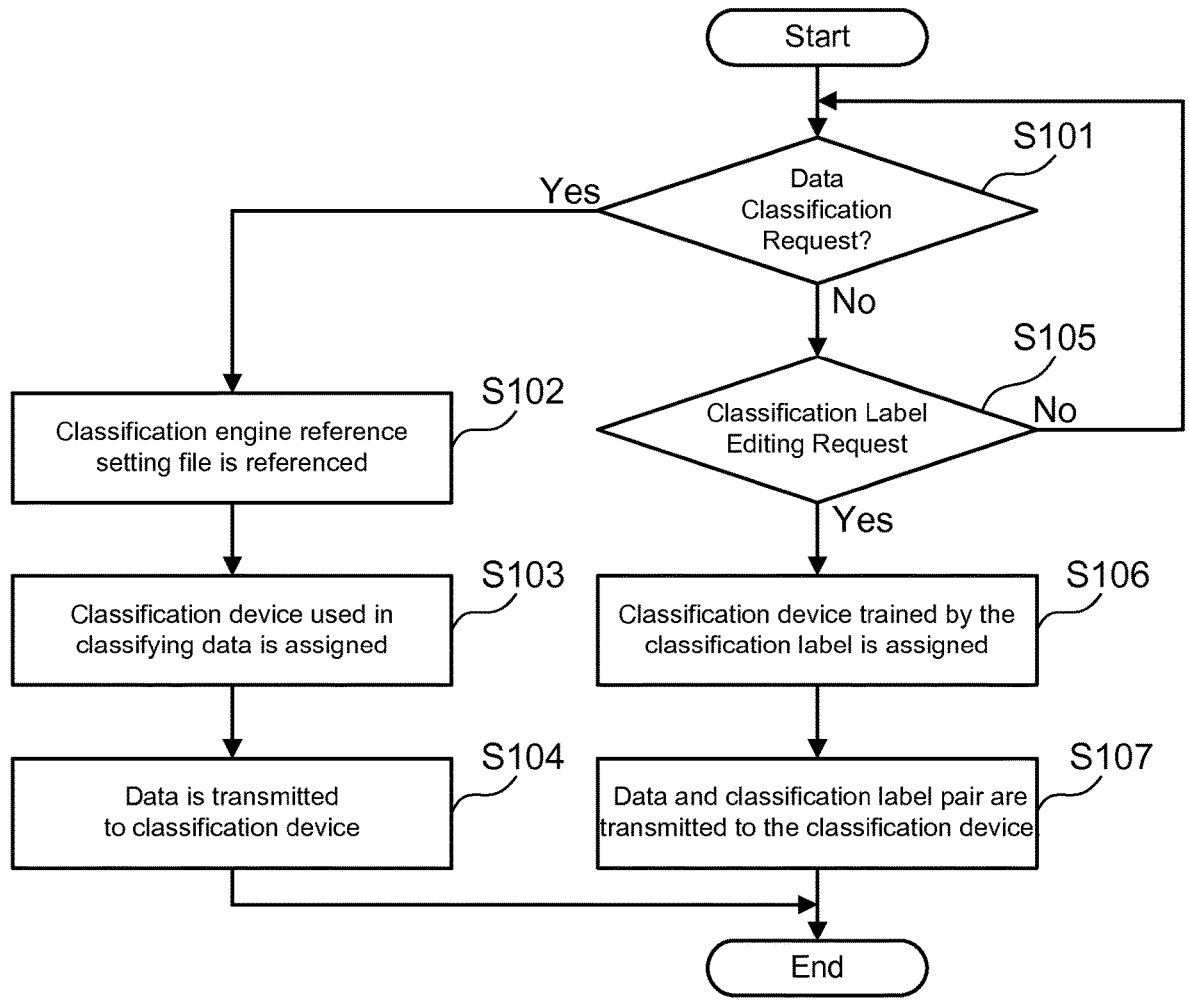
FIG. 9 is a flow chart depicting an example of an operation of a classification engine referencing part in the access control device for an embodiment of the present invention.

FIG. 9 is a flow chart depicting an example of an operation of a classification engine referencing part 13. As depicted in the chart, the classification engine referencing part 13 first determines whether or not the data classification request has been communicated from the data acquiring part 11 (step 101). If the data classification request has been communicated, then the classification engine referencing part 13 references the classification engine reference setting file recorded in the classification engine reference setting recording part 14 (step 102). Furthermore, the classification device 20 for classifying the data is assigned by comparing information related to the data and the access included in the data classification request, and the conditions described in the classification engine reference setting file (step 103). Thereby, the classification engine referencing part 13 transmits the data included in the data classification request to the assigned classification device 20 (step 104).

On the other hand, if the data classification request has not been communicated from the data acquiring part 11, then the classification engine referencing part 13 determines whether or not the classification label editing request has been communicated from the classification label editing part 12 (step 105). If the classification label editing request has also not been communicated, then the process returns to step 101, but if the classification label editing request has been communicated, then the classification engine referencing part 13 assigns the classification device 20 that performs learning by the classification labels based on the conditions during classification label editing (step 106). Thereby, the classification engine referencing part 13 transmits the pair of the data included in the classification label editing request and the classification labels, to the assigned classification device 20 (step 107).

Incidentally, if the classification engine referencing part 13 transmits the data to the plurality of classification devices 20 in step 104, then the data analyzing parts 22 in the plurality of classification devices 20 each communicate the classification results to the classification results processing part 15. Thereby, the classification results processing part 15 integrates the classification results.

Figure 10:
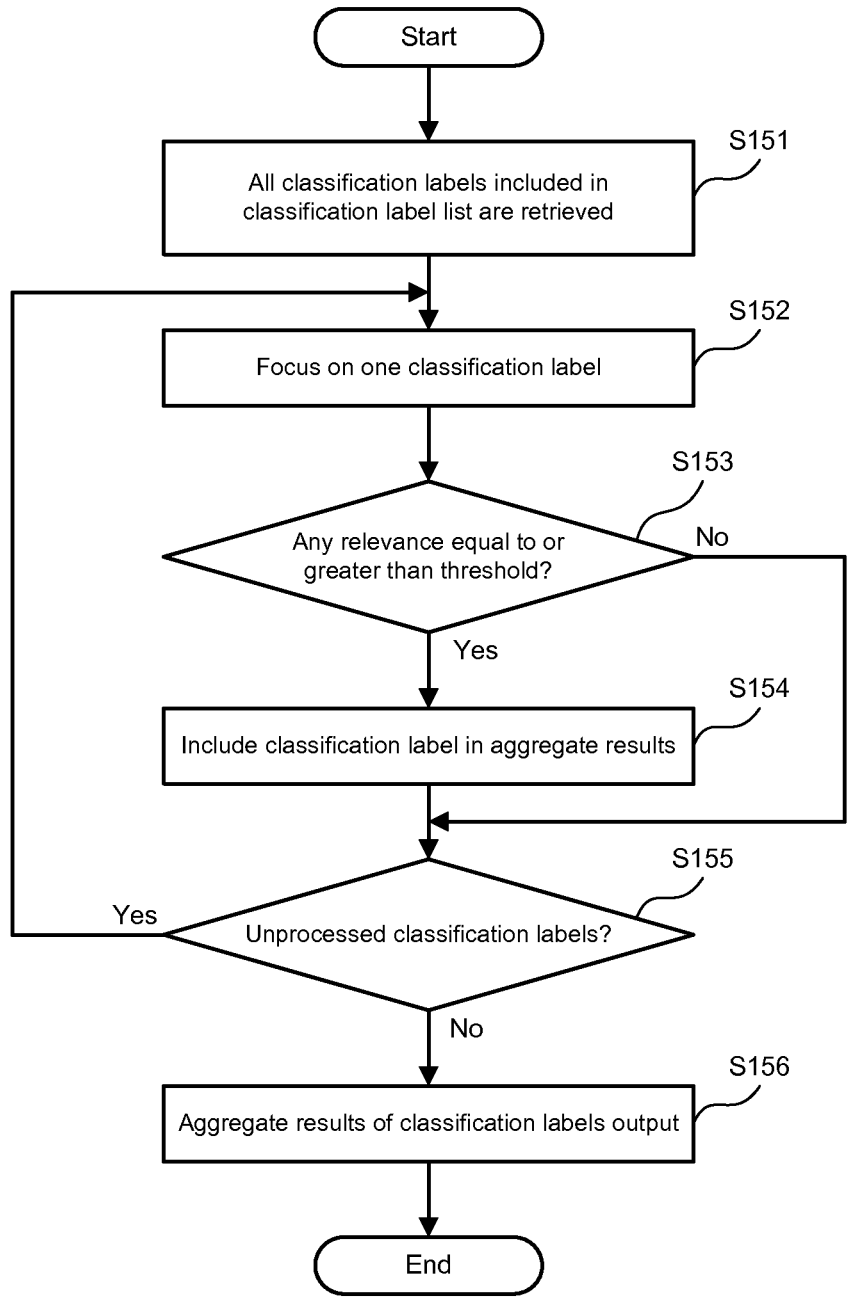
FIG. 10 is a flow chart depicting an example of an operation for a classification results processing part in the access control device for an embodiment of the present invention.

FIG. 10 is a flow chart depicting an example of operation of a classification results processing part 15 at this time. Note that the flow chart depicts an example of an operation where the third method has been selected from the aggregate methods of the aforementioned classification results. Furthermore, the classification results processing part 15 attains the classification results in a format where the relevance is associated to each classification label of the classification label list.

As depicted in the chart, the classification results processing part 15 first retrieves all the classification labels included in the classification label list obtained from the plurality of classification devices 20 (step 151). However, the classification labels included in common in the plurality of classification label lists are retrieved as one classification label. For example, if classification label lists "A" and "B" are obtained from the classification device 20a, classification label lists "A" and "C" are obtained from the classification device 20b, and classification label lists "A" and "D" are obtained from the classification device 20c, then classification labels "A," "B," "C," and "D" can be retrieved.

Next, the classification results processing part 15 performs processing steps 152 through 155 while focusing one at a time on each classification label. In other words, the classification results processing part 15 first focuses on one classification label (step 152). Furthermore, a determination is made as to whether or not there is relevance equal to or greater than the predetermined threshold included in the relevance that corresponds to the focused classification label (step 153). If the classification label only appears once in the classification label list obtained from the plurality of classification devices 20, then a determination can be made as to whether or not the relevance corresponding to the classification label in the one appearance is equal to or greater than the threshold. On the other hand, if the classification label appears multiple times in the classification label list obtained from the plurality of classification devices 20, then a determination can be made as to whether or not the maximum value of the relevance corresponding to the classification label in the multiple appearances is equal to or greater than the threshold. For example, if a classification label and relevance "A 90%" is obtained from the classification device 20a, a classification label and relevance "A 70%" is obtained from the classification device 20b, a classification label and relevance "A 50%" is obtained from the classification device 20c, and the threshold is 80%, then a determination can be made as to whether or not the relevance obtained from the classification device 20a is equal to or greater than the threshold.

As a result, if it has been determined that a relevance equal to or greater than the threshold exists in the relevance corresponding to the classification label, then the classification label is included in the aggregate results (step 154), and the process proceeds to step 155. On the other hand, if it has been determined that a relevance equal to or greater than the threshold does not exist in the relevance corresponding to the classification label, then the classification label is not included in the aggregate results, and the process proceeds to step 155.

Afterwards, the classification results processing part 15 determines whether or not an unprocessed classification label exists (step 155). Furthermore, if an unprocessed classification label exists, then the process returns to step 152, and if an unprocessed classification label does not exist, then the classification label included in the aggregate results in step 154 is output to the access control policy determining part 16 and the classification label editing part 12 (step 156).

As described above the present embodiment introduced a classification device for a specific application. Thereby, classification of data that could not be covered by the centralized or general use classification policy became possible. For example, classification of the latest technical terminology, concepts, data including terminology of particular fields, team and project specific data, private data specializing in individuals, and the like has become possible.

Furthermore, with the present embodiment, setting of references of an arbitrary classification device 20 became possible. Thereby, preferable classification became possible at that time. For example, only during a specific project period, determination of sensitivity of information related to the project became possible during the project by forcibly referencing a project specific classification device 20 to project members. Furthermore, when a data of a past project is referenced, determination of sensitivity at the time of the past information became possible by spontaneously referencing a project specific classification device 20.

Alternatively, access restriction became possible based on the location that accessed the data. For example, situations such as the following can be considered: at a business establishment, security is covered by a firewall, so the classification device 20 is not forcibly referenced, but at home, the security is unknown, so the classification devices 20 are forcibly referenced.

Furthermore, with the present embodiment, a data viewer provides feedback regarding the classification results to the specific application classification device 20. Thereby, the knowledge base 24 in the classification device 20 and classification rule are timely updated, and classification processing specialized for the user can be performed with high accuracy.

In accordance with the inventive arrangement disclosed herein, access control content for data subject to access is determined from various perspectives. In the access control device 10, the data acquiring part 11 acquires the data subject to access, the classification engine referencing part 13 indicates the classification of the data subject to access to the plurality of classification devices that are determined based on the classification engine reference setting file recorded in the classification engine reference setting recording part 14, the classification results processing part 15 integrates to the classification results obtained by the plurality of classification devices classifying the data subject to access, the classification access control policy determining part 16 determines the content of access control to the data subject to access based on the aggregate results by the integration and the access control policy file recorded in the access control policy recording part 17, and the access control part 18 performs access control of the content determined in the data subject to access.

Herein, embodiments of the present invention can be achieved completely by the hardware, or can be achieved completely by the software. Furthermore, achieving by both the hardware and the software is also possible. Furthermore, the present invention can be achieved by a computer, a data processing system, or a computer program. The computer program is recorded to a medium readable by a computer, and can be provided. Herein, an electronic type, a magnetic type, an optical type, an electromagnetic type, an infrared or semiconductor system (device or equipment), or a transmission type medium can be considered for the medium. Furthermore, a semiconductor, a solid state recording device, a magnetic tape, a readable computer diskette, a random access memory (RAM), a read only memory (ROM), a rigid magnetic disk, and an optical disk are exemplified for the medium readable by a computer. With the example of the optical disk at the present time, a compact disk read only memory (CD-ROM), a compact disk read/write (CD-R/W), and DVD are included.

The present invention was described above using the embodiments, but the technical scope of the present invention is not restricted to the above mentioned embodiments. The fact that various modifications can be made, as well as adoption of alternative embodiments, without deviating from the spirit and scope of the present invention will be clear to persons skilled in the art.

What is claimed is:

1. A computer-implemented method for controlling access to data subject to access control, comprising:
   determining that the data subject to access control is subject to an access request by a user;
   acquiring access information including the data subject to access control and the access request;
   selecting, using the access information and a classification engine reference setting file, a plurality of classification engines including a general use classification engine and a specific application classification engine;
   receiving, from each of the plurality of classification engines each using the same access information, a classification result thereby resulting in a plurality of classification results received from the plurality of classification engines; and
   denying the access request based upon the plurality of classification results, wherein
   each of the received classifications results are independently generated, respectively, by the plurality of classifications engines,
   the classification engine reference setting file defines the specific application classification engine based upon at least one condition during the access request, and
   each of the plurality of classification engines include:
   a knowledge base,
   a data extracting part configured to extract structured data from the data subject to access control, and
   a data analyzing part configured to analyze the structured data using the knowledge base.

2. The method of claim 1, wherein
the access request by a user is based upon the using intending to email the data subject to access control to an intended recipient.

3. The method of claim 1, wherein
the at least one condition includes at least one of:
   the data subject to access being an encrypted file,
   the data subject to access being located into a specific folder, and
   the data subject to access being a compressed file.

4. The method of claim 1, wherein
the specific application classification engine is specific to the user.

5. The method of claim 1, wherein
the access request being denied is based upon user settings upon the plurality of classification engines providing different classification results.

6. The method of claim 1, wherein
the classification engine reference setting file is specific to the user.

7. The method of claim 1, wherein
the classification engine reference setting file is specific to an intended recipient of the data subject to access control.

8. A computer hardware system configured to control access to data subject to access control, comprising:
a hardware processor configured to initiate the following executable operations:
determining that the data subject to access control is subject to an access request by a user;
acquiring access information including the data subject to access control and the access request;
selecting, using the access information and a classification engine reference setting file, a plurality of classification engines including a general use classification engine and a specific application classification engine;
receiving, from each of the plurality of classification engines each using the same access information, a classification result thereby resulting in a plurality of classification results received from the plurality of classification engines; and
denying the access request based upon the plurality of classification results, wherein
each of the received classifications results are independently generated, respectively, by the plurality of classifications engines,
the classification engine reference setting file defines the specific application classification engine based upon at least one condition during the access request, and
each of the plurality of classification engines include:
a knowledge base,
a data extracting part configured to extract structured data from the data subject to access control, and
a data analyzing part configured to analyze the structured data using the knowledge base.

9. The system of claim 8, wherein
the access request by a user is based upon the using intending to email the data subject to access control to an intended recipient.

10. The system of claim 8, wherein
the at least one condition includes at least one of:
the data subject to access being an encrypted file,
the data subject to access being located into a specific folder, and
the data subject to access being a compressed file.

11. The system of claim 8, wherein
the specific application classification engine is specific to the user.

12. The system of claim 8, wherein
the access request being denied is based upon user settings upon the plurality of classification engines providing different classification results.

13. The system of claim 8, wherein
the classification engine reference setting file is specific to the user.

14. The system of claim 8, wherein
the classification engine reference setting file is specific to an intended recipient of the data subject to access control.

15. A computer program product, comprising:
a hardware storage device having stored thereon program code for controlling access to data subject to access control,
the program code, which when executed by a computer hardware system, causes the computer hardware system to perform:
determining that the data subject to access control is subject to an access request by a user;
acquiring access information including the data subject to access control and the access request;
selecting, using the access information and a classification engine reference setting file, a plurality of classification engines including a general use classification engine and a specific application classification engine;
receiving, from each of the plurality of classification engines each using the same access information, a classification result thereby resulting in a plurality of classification results received from the plurality of classification engines; and
denying the access request based upon the plurality of classification results, wherein
each of the received classifications results are independently generated, respectively, by the plurality of classifications engines,
the classification engine reference setting file defines the specific application classification engine based upon at least one condition during the access request, and
each of the plurality of classification engines include:
a knowledge base,
a data extracting part configured to extract structured data from the data subject to access control, and
a data analyzing part configured to analyze the structured data using the knowledge base.

16. The computer program product of claim 15, wherein
the access request by a user is based upon the using intending to email the data subject to access control to an intended recipient.

17. The computer program product of claim 15, wherein
the at least one condition includes at least one of:
the data subject to access being an encrypted file,
the data subject to access being located into a specific folder, and
the data subject to access being a compressed file.

18. The computer program product of claim 15, wherein
the specific application classification engine is specific to the user.

19. The computer program product of claim 15, wherein
the access request being denied is based upon user settings upon the plurality of classification engines providing different classification results.

20. The computer program product of claim 15, wherein
the classification engine reference setting file is specific to the user.

* * * * *